Dec. 30, 1947.  A. A. BURCKLE  2,433,425

FABRICATED HIGH PRESSURE COUPLING

Filed March 20, 1945

INVENTOR.
ARTHUR A. BURCKLE.
BY
ATTORNEY.

Patented Dec. 30, 1947

2,433,425

UNITED STATES PATENT OFFICE 2,433,425

FABRICATED HIGH-PRESSURE COUPLING

Arthur A. Burckle, Burbank, Calif., assignor to Aero-Coupling Corporation, Burbank, Calif., a corporation of California Application March 20, 1945, Serial No. 583,707

8 Claims. (Cl. 285—84)

This invention relates to the coupling terminals of very high pressure flexible fluid hose and more especially to a novel coupling terminal and method of fabricating the same. The present application is for improvements on the coupling disclosed in my co-pending application filed January 1, 1945, Serial No. 570,838.

The general object and purpose of my invention is to produce a coupling structure having improved features of simplicity in the structure itself, and in the method of fabricating the structure which includes several parts to be assembled and secured together and to the end of a flexible hose.

A more specific object of the invention is to provide a novel coupling structure of unusually light weight, however, having features of strength comparable to heavier couplings as heretofore made.

Another object of the invention is to provide a coupling structure fabricated of several parts which are associated together and secured to the end of a hose without the necessity of employing screw thread connections.

An additional object of the invention is to provide a hose coupling structure having a strong and durable swivel connecting member for attachment to a tool, nozzle, or other device with which the fluid pressure conveyed by the hose is to be used.

An additional object of the invention is to provide a coupling of the character described, formed substantially of the light weight material, such as an aluminum alloy, which material may be easily formed and is responsive to deforming operations, such as drawing through dies, or subjected to stamping, and in which a re-inforcing element such as a steel sleeve may be incorporated to provide additional strength.

Other objects and advantages will appear and be brought out more fully in the following specification considered with reference to the accompanying drawing throughout which like parts are designated by like numerals.

Figure 1:
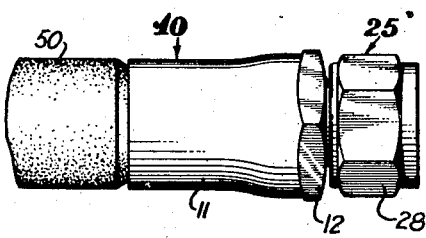
Figure 1 is a side view of a coupling structure and the end portion of a hose secured thereto showing an embodiment of my invention.
Figure 2:
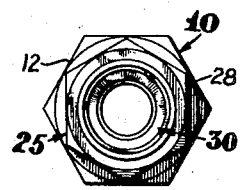
Figure 2 is an end view of the same.
Figure 3:
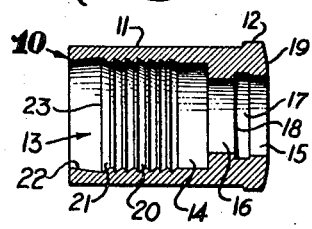
Figure 3 is a view in central section showing the body or ferrule portion of the coupling.
Figure 4:
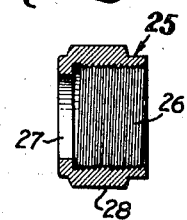
Figure 4 is a view in central section of the swivel nut feature.

Flexible hose as a conductor of fluid, including both liquid and air or other gases, has many important industrial applications and in its uses, terminal connections or couplings are necessary, as is well-known, both for joining together sections of such hose, as well as attachment of an end of the hose to a machine or device for supplying, receiving or utilizing the fluid medium.

Terminal or coupling structures connected to the end of the hose generally comprise a body or ferrule which overlies the external end portion of the hose and a hollow stem or sleeve element which extends into the end bore of the hose, the hose being secured or clamped to the sleeve or stem or to the ferrule or to both in various ways. The internal bore of the ferrule and the external portion of the sleeve are preferably provided with grooves forming ribs, which may have sharpened end portions for firmly engaging the fabric or resilient wall structure of the hose, and the hose is clamped to these elements by die forming or drawing operations which may comprise a contraction of a wall portion of the ferrule or the expansion of a wall portion of the sleeve, or both. The ferrule and sleeve have complementary enlarged portions for more completely effecting the clamping and gripping of the hose wall, and in order for these enlarged portions to be properly positioned with respect to each other in the final assembly of the coupling, the coupling elements are provided with certain registering grooves and shoulders or abutments as will be more fully disclosed hereinafter. In one form of the invention shown, a reaming operation of the sleeve may be necessary, however, in another form of the invention, no such reaming is necessary.

Referring more particularly to the drawing, I show a hose coupling structure comprising a body or ferrule 10, a swivel nut 25 and a stem or sleeve element 30. Ferrule 10 has a substantially cylindrical portion 11 and a shouldered end portion 12 which may be polygonal, or square, or have other configuration for engagement with a tightening wrench or tool. The ferrule has a bore 13 constituted of an enlarged portion 14, a reduced portion 15 and a further reduced portion 16 separated from portion 15 by an annular groove 17 forming a shoulder 18. An end portion 19 is shown which forms an abutment for the swivel nut 25 as will be more fully described hereinafter. Bore 14 is provided with a plurality of grooves 20 forming ribs which may have tapered sides, or otherwise sharpened for more effectively providing gripping action on the hose wall. Bore 14 is also provided with tapered portions 21 and 22 adjacent the end removed from shoulder 12, the tapered portions forming an enlargement 23 in which the hose wall is forced to further provide gripping action by the coupling elements.

Swivel nut 25 is provided with a threaded bore 26, a collar portion 27 at the opposite end from the threaded portion, and a polygonal shaped exterior portion 28, such as hexagonal or otherwise, for tightening by a wrench or other tool.

Figure 5:
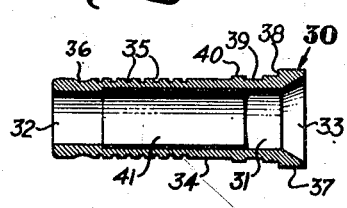
Figure 5 is a view in central section showing the sleeve element of the coupling.

In Figure 5 I show one form of sleeve element used in forming the connector, the sleeve element being designated 30 and shown as having a main bore 31 and a reduced bore 32, bore 31 terminating in a flared or tapered portion 33. The body of the sleeve is generally cylindrical as at 34, which portion is provided with a plurality of annular grooves 35 and a groove 36 positioned as shown near the inner end of the sleeve, the inner end being considered the portion which is extended into the hose. Groove 36 is seen as being somewhat wider than grooves 35 and is curved to form an enlargement which will be presented opposite enlargement 23 of the ferrule when the assembly with ferrule 10 is completed.

Figure 7:
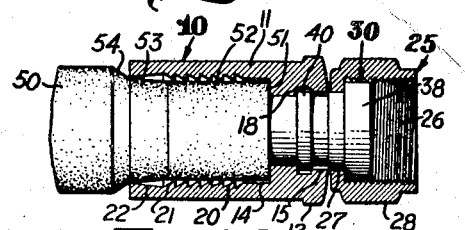
Figure 7 is a view in central section showing the coupling elements in assembled relation and a step in the connecting of a hose therewith.

Sleeve member 30 is provided with an annular shoulder 37 at the outer end forming an annular abutment 38. The sleeve 30 is formed with an annular groove 39 and an annular shoulder 40 adjacent thereto for alignment with bore 15 and groove 17 of ferrule 10, as may be more clearly seen in Figures 7 and 8.

Ferrule 10 and sleeve 30 are preferably, although not necessarily, made of malleable material, such as a light weight alloy of aluminum (Dural would be a suitable material), however, an important feature of my invention is the provision of means for strengthening the sleeve to withstand the very high pressures at which the connector of this invention is intended to operate. Such means comprise a tubular liner or insert 41 which is machined and finished for a pressed fit in bore 31, with the inner end thereof adjacent reduced bore 32 and the bore of liner 41 being of substantially the same diameter as that of bore 32. The outer end of liner 41 terminates approximately within or opposite groove 39 of annular shoulder 40.

Figure 6:
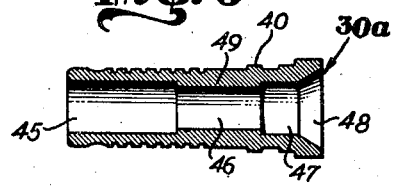
Figure 6 is a view similar to Figure 5 showing a modified form of sleeve element.
Figure 9:
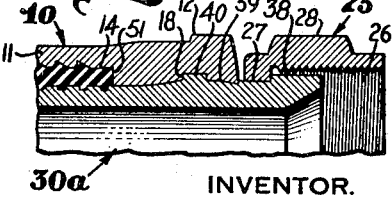
Figure 9 is a fragmentary view in section showing a feature of the final assembly using the sleeve as shown in Figure 6.

In Figures 6 and 9 I show a modified form of sleeve element 30a. This sleeve element is substantially similar to sleeve element 30, however, it is provided with bore portions 45, 46, 47 and 48. Bore portions 45 and 47 are of substantially the same diameter, while bore portion 46 is of reduced diameter forming a fillet 49, a portion of which is approximately opposite annular shoulder 40. Bore portion 48 is tapered similarly to tapered portion 33 of sleeve element 30.

In assembling the coupling the first step is the placing of swivel nut 25 on sleeve 30 with the threaded portion of bore 26 extending beyond the shouldered end 37 and with collar portion 27 of the nut adjacent shoulder 38 of the sleeve. The sleeve element 30 is then inserted in ferrule 10 so that annular shoulder 40 engages shoulder 18 of the ferrule and shoulder 40 is substantially aligned with groove 17, it being understood that the outer diameter of shoulder 40 is less than that of bore 15 to permit passing therethrough.

The next step in the assembly of the coupling and hose is the enlargement of sleeve 30 in the portion thereof within or opposite groove 39 and shoulder 40. This enlargement may be made by a suitable expansion die, such as a tapered pin or other tool, which will extend partially into tubular insert 41, and the enlargement of the sleeve results in an intimate engagement with groove 17 and the collar formed by end portion 19 and bore 15. It will be understood that ferrule 10 is placed in a die member or other tool which prevents expansion of the ferrule when the sleeve is expanded as described. The metal in contact seizes after the swedging operation, and the ferrule and sleeve are permanently jointed together.

The assembly of the coupling and connection to the hose is illustrated in Figures 3, 4, 5, 7 and 8 using the connector employing the sleeve element of Figure 5. The hose is designated 50 and it will be understood that the hose may and usually comprises a plurality of concentric tubular walled layers of woven fabric and resilient material such as rubber, and may include a reinforcing layer of a metallic weave or mesh of suitable structure, the integrated hose being flexible. In preparing the hose for connection with the connector of this application, an end 51 is cut square, and a portion 52 adjacent thereto is cut down in external diameter, and a portion 53 adjacent thereto is formed with a taper, and a further tapered portion 54 is formed between portion 53 and the external wall portion of the hose.

The next step in the assembly is the insertion of the end of the hose 50 in ferrule 10 by inserting end 51 in bore 13 to the depth limited by the shoulder formed by reduced bore 16.

Figure 8:
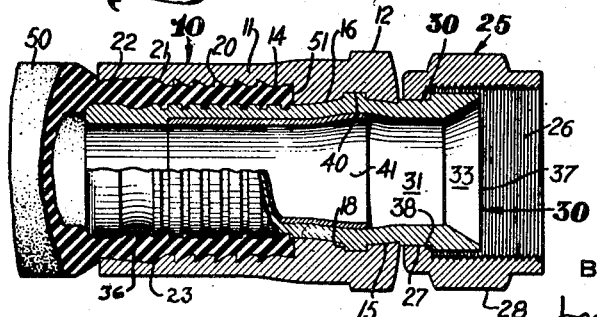
Figure 8 is an enlarged view in central section showing the completed assembly of the coupling and the hose attachment.

The ferrule is then contracted in external diameter, as shown in Figure 8, by means of a die, the contraction being substantially along the length thereof which is external to bore 14, and this results in a firm gripping and clamping of the end of the hose between the ferrule and the sleeve. The configuration of tapered bores 21 and 22 forming enlargement 23 and the presence of groove 36 of the sleeve substantially opposite enlargement 23 results in a compression of the hose wall and a drawing of the hose wall into the recess formed by bore 13 and the external wall of the sleeve. The hose is thus drawn inwardly into the recess, and the ribs formed by grooves 20 and 35 further add to the gripping effect on the hose and prevent it being forced out due to the fluid pressure or in other manner.

If a sleeve, such as shown in Figure 9, is used not having a liner but having the fillet 49, after expansion of the sleeve and the fillet portion, the fillet is reamed out forming a continuous bore as is shown in Figure 9. After thus completing the coupling, the assembly of hose and coupling is accomplished in the manner already described.

It will thus be seen that I have provided a unique and strong coupling structure, the joining of ferrule 10 and sleeve 30 or 30a being a substantially integral connection which is for all practical purposes inseparable and wherein mutual longitudinal displacement of the ferrule and the sleeve is prevented. The material of which the ferrule and sleeve are made is, as stated, preferably a malleable material, such as an alloy of aluminum as Dural, brass, or other metal, and the use of this material is desirable because of its cheapness, light weight and easy workability, and the provision of liner 41 of steel or other material having considerably higher tensile strength than the body of the coupling, permits the coupling to operate at very high pressures which may even reach thirty thousand pounds per square inch. It will be noted that in the formation and assembly of the coupling elements no threaded connections are used.

The form shown in Figures 6 and 9 will ordinarily be used in connections subject to a pressure range of 5000 to 15,000 p. s. i., the other form with the steel insert under pressure ranges of 10,000 to 30,000 p. s. i., although I do not limit the invention to these recommended conditions.

As an example of the advantage in lightness gained by the combination shown in Figures 1 to 5, 7 and 8, I may use .095" Dural and .035" steel tube for a total wall thickness of .125" in the ferrule, and secure a coupling which will test as high as one which has a solid steel wall of the same total thickness.

The swivel nut 25, which is a female type of connector, is shown as illustrative of typical devices for connecting to another connector secured to a tool, tank, or another hose coupling element, and it will be understood that other forms of connector in place of the swivel nut 25 may be used, such, for example, as a threaded male or female end on the sleeve 30 in lieu of the shoulder 37 and swivel nut 25. In such a modification I may desire to assemble the coupling by inserting sleeve 30 in ferrule 10 from the left end instead of the right end, as described hereinabove, by suitably proportioning the respective shoulders and interfitting grooves.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim and desire to secure by Letters Patent is:

1. A coupling structure for flexible hose comprising a sleeve having a portion adapted to be inserted in the end portion of a hose and having a ferrule engaging portion adjacent thereto, and a ferrule having a hose receiving bore and a sleeve engaging portion, said sleeve having an internal fillet opposite said ferrule engaging portion, said fillet and said ferrule engaging portion of said sleeve having an expanded condition under pressure effective of a tight permanent engagement with a portion of said ferrule, said ferrule remote from the sleeve engaging portion having a contracted condition adapted to clamp a hose wall against said sleeve.

2. A coupling structure for flexible hose comprising a sleeve having a portion adapted to be inserted in the end portion of a hose and having a ferrule engaging portion adjacent thereto, and a ferrule having a hose receiving bore and a sleeve engaging portion, said ferrule engaging portion of said sleeve adapted to be expanded under pressure to effect a tight permanent engagement with said ferrule said sleeve having a portion extending outwardly from the ferrule and means to detachably connect said portion of the sleeve to a tool fitting.

3. A coupling structure for flexible hose comprising a sleeve having a portion adapted to be inserted in the end portion of a hose and having a ferrule engaging portion adjacent thereto, and a ferrule having a hose receiving bore and a sleeve engaging portion, said ferrule engaging portion of said sleeve adapted to be expanded under pressure to effect a tight permanent engagement with said ferrule, a sleeve portion extending outwardly from the ferrule and means to detachably connect said sleeve portion to a tool fitting, said means including a swivel nut on said sleeve.

4. A coupling structure for flexible hose comprising a sleeve having a portion adapted to be inserted in the end portion of a hose and having a ferrule engaging portion adjacent thereto, and a ferrule having a hose receiving bore and a sleeve engaging portion, said ferrule engaging portion of said sleeve adapted to be expanded under pressure to effect a tight permanent engagement with said ferrule and means to detachably connect said sleeve to a tool fitting, said means including a swivel nut on said sleeve and a retaining shoulder on said sleeve, said ferrule having an annular abutment located within the ferrule adapted to limit slidable movement of said nut on said sleeve.

5. A coupling structure for flexible hose comprising a sleeve having a portion adapted to be inserted in the end portion of a hose and having a ferrule engaging portion adjacent thereto, and a ferrule having a hose receiving bore and a sleeve engaging portion, said sleeve having a tubular insert of higher tensile strength than said sleeve, said insert and said ferrule engaging portion of said sleeve adapted to be expanded under pressure to effect a tight permanent engagement with said ferrule.

6. A coupling structure for flexible hose comprising a sleeve having a portion adapted to be inserted in the end portion of a hose and having a ferrule engaging portion adjacent thereto, and a ferrule having a hose receiving bore and a sleeve engaging portion, said sleeve having a tubular insert of higher tensile strength than said sleeve, said insert and said ferrule engaging portion of said sleeve adapted to be expanded under pressure to effect a tight permanent engagement with said ferrule, said tubular insert having an end portion positioned within and opposite the ferrule engaging portion of said sleeve.

7. A coupling structure for flexible hose comprising a sleeve having a portion adapted to be inserted in the end portion of a hose and having a ferrule engaging portion adjacent thereto, and a ferrule having a hose receiving bore and a sleeve engaging portion, said ferrule engaging portion of said sleeve adapted to be expanded under pressure to effect a substantially integral engagement, said ferrule and said sleeve having internal engaging portions adapted to secure said ferrule and said sleeve against mutual longitudinal displacement, said sleeve and said ferrule having interfitting collar and groove portions adapted to strengthen said engagement and align said parts for assembly.

8. A coupling structure for a fluid conductor comprising a sleeve having a portion of one diameter adapted to be inserted in the end portion of the conductor and an outwardly extending annular ferrule engaging portion adjacent thereto, a ferrule having a recess adapted to receive the conductor and an aperture having a reduced portion forming a shoulder therein and another portion of larger diameter, said annular ferrule engaging portion in initial position of the structure having an abutting location against the shoulder adapted thereby to locate the sleeve within the ferrule, said sleeve having a portion extending from the annular ferrule engaging portion outwardly in the ferrule and in mutual endwise engagement therewith when the structure is in assembled form.

ARTHUR A. BURCKLE.

REFERENCES CITED

The following references are of record in the file of this patent:

UNITED STATES PATENTS

| Number | Name | Date |
|---|---|---|
| 1,915,041 | Wallace | June 20, 1933 |
| 1,808,101 | Eastman | June 2, 1931 |
| 2,006,828 | Flynt | July 2, 1935 |